United States Patent [19]

Young et al.

[11] Patent Number: 5,037,168
[45] Date of Patent: Aug. 6, 1991

[54] OPTICAL WAVEGUIDES

[75] Inventors: Terence P. Young, Chelmsford; Philip H. Wisbey, Colchester; Nicholas A. Davies, Maldon, all of United Kingdom

[73] Assignee: GEC-Marconi Limited, Stanmore, United Kingdom

[21] Appl. No.: 400,652

[22] Filed: Aug. 31, 1989

[30] Foreign Application Priority Data

Sep. 3, 1988 [GB] United Kingdom ............... 8821688

[51] Int. Cl.$^5$ .............................................. G02B 6/10
[52] U.S. Cl. .................................................. 385/130
[58] Field of Search ..................................... 350/96.12

[56] References Cited

U.S. PATENT DOCUMENTS 4,902,086  2/1990  Henry et al. ................... 350/96.12

FOREIGN PATENT DOCUMENTS 149678  7/1985  European Pat. Off. .

Primary Examiner—William L. Sikes
Assistant Examiner—Robert E. Wise
Attorney, Agent, or Firm—Spencer & Frank

[57] ABSTRACT

A smoothing layer is provided between the rough etched sides of a channel in a substrate in which an optical waveguiding material is to be produced. Losses are substantially reduced thereby. For a rectangular or rib waveguide, where the sides of the rib are left rough by etching, a smoothing layer is again provided over the rib. The smoothing layer preferably has a refractive index close to or the same as the materials having surface roughness.

9 Claims, 1 Drawing Sheet

OPTICAL WAVEGUIDES

FIELD OF THE INVENTION

1. Background of the Invention

This invention relates to an optical waveguide and to methods of forming optical waveguides.

An optical waveguide is an elongate structure providing two-dimensional confinement of light in its transverse plane.

2. Description of the Prior Art

Electro-optically active polymers show great potential for making high speed integrated optical modulators and switches. In a high speed optical modulator, for example, an electrode structure is included which normally supports a microwave mode. This mode will ideally travel collinearly with the optical signal, yielding an electro-optically induced phase advance or retardation with distance.

In making polymer waveguides for integrated optical modulators, for example, one of the main loss mechanisms is side wall roughness. Surface roughness due to the etching techniques used to define the waveguide structure typically have RMS standard deviations of a few to a few hundred nanometers.

For example, where the waveguide is formed by producing a channel in a substrate by processes such as reactive ion etching, with the active polymer then being provided in the channel, the etching processes leave a rough side wall finish. This is also true for multi-layer polymer structures where some etchant or solvent is used to cut through one layer in the waveguide region. Such layers are typically fabricated by dip or spin coating.

BRIEF SUMMARY OF THE INVENTION

The present invention provides, in one aspect, an optical waveguide, comprising an elongate body of an active waveguiding material of first refractive index surrounded by material of lower refractive index, and a smoothing layer between at least a portion of the surface of the elongate body and the surrounding material, the smoothing layer being such as to produce an interface of substantially reduced roughness between the material of first refractive index and material having a lower refractive index.

At least part of the elongate body of waveguiding material is located in a channel defined by material of lower refractive index.

Another aspect of the invention provides a method of forming an optical waveguide, comprising forming a channel in a substrate, providing a smoothing layer on at least a portion of the walls of the channel, thereby substantially reducing the surface roughness of the walls, and filling the channel with a waveguiding medium having a higher refractive index than those of the smoothing layer and the substrate.

The smoothing layer is preferably very thin, and may be provided by spin coating with a polymer solution. Ideally, the thickness of the smoothing layer is sufficient to fill the microscopic roughnesses of the side walls, while being substantially smaller than the cross-sectional dimensions of the waveguides. A substantial reduction in signal losses along the waveguide may be achieved by the use of the smoothing layer in accordance with the invention.

DETAILED DESCRIPTION OF THE PREFERRED EMBODIMENT

Figure 1:
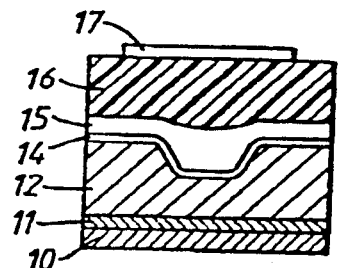
FIG. 1 is a schematic sectional elevation of a waveguide according to one embodiment of the invention.
Figure 2:
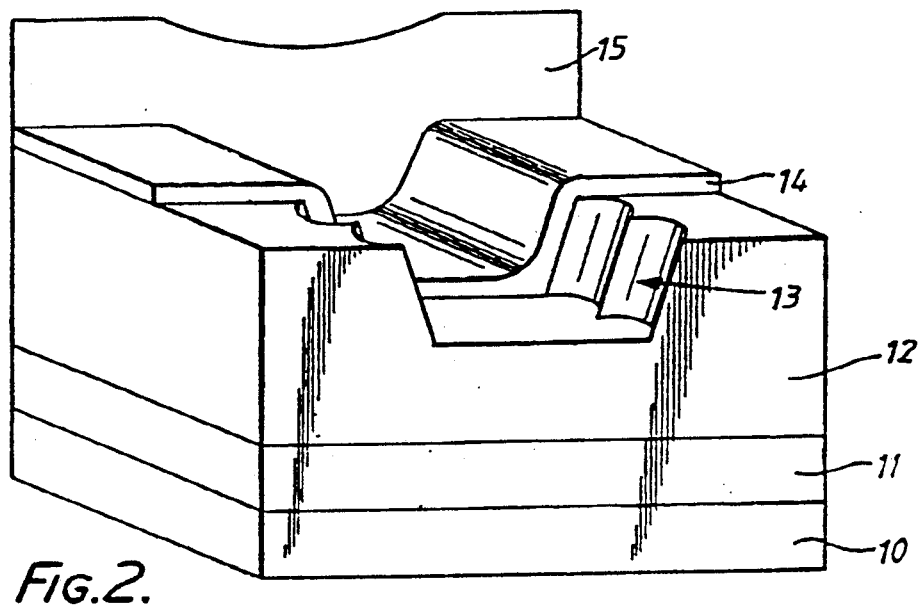
FIG. 2 is a perspective view, on an enlarged scale, of a section of the waveguide shown in FIG. 1.

FIG. 1 illustrates an inverted rib waveguide comprising a substrate 10, which may have an overlying electrode layer 11, for example of gold, and a buffer layer 12 having a refractive index $n_2$. The buffer layer 12 is formed by growing a crystalline body of silicon oxynitride (SiON), the substrate 10, electrode layer 11 and buffer layer 12 forming a substrate member. A channel 13 (FIG. 2) is formed in the buffer layer 12 by reactive ion etching to a suitable dept, the dimensions of the channel being such that the waveguide formed therein gives a single mode structure. The etching leaves roughness, particularly on the walls of the channel 13, shown in exaggerated form in FIG. 2. A smoothing layer 14 is formed on the surface of the buffer layer 12, by spin or dip coating of a solution of a polymer having a refractive index as close as possible to the refractive index $n_2$ of the buffer layer. A solution of 5% by weight of polyvinyl benzyl chloride in toluene may be used for the dip coating. The layer is cured by baking at 140° C. in vacuo for 16 hours, followed by a further hour at 200° C.

A layer 15 of active waveguiding polymeric material is then coated onto the surface of the smoothing layer. The material of this layer 15 has a higher refractive index $n_1$ than the refractive index of the buffer layer $n_2$. Finally, as may be seen from FIG. 1, a further buffer layer 16 of polymeric material is provided over the layer of the active waveguiding material 15. This further buffer layer has a lower refractive index $n_3$ which may be close to that of the first buffer layer 12. A second electrode layer 17 can be provided on top of the buffer layer 16. It will be appreciated that the first buffer layer 12 could also be formed of a polymeric material, in which case the smoothing layer may be of a material which can be coated on to the buffer layer without substantial dissolution thereof. Where the polymeric buffer layer can be subjected to a suitable curing process to minimise dissolution effects, the smoothing layer may comprise the same polymer as is used to form the buffer layer.

We claim:

1. An optical waveguide comprising
   an elongate body of an active polymeric waveguiding material of first refractive index located in a channel formed in a substrate material of lower refractive index; and
   a polymeric smoothing layer having a lower refractive index than said waveguiding material, said smoothing layer being located in said channel between said elongate body and said substrate material.

2. An optical waveguide according to claim 1, wherein said smoothing layer comprises a material having a refractive index substantially equal to that of said substrate material.

3. An optical waveguide comprising:
   a substrate member including a first buffer layer having a channel therein defined by a wall of given roughness, said first buffer layer having a refractive index $n_2$;

an elongate body composed of an active polymeric waveguiding material located in said channel, said elongate body having a refractive index $n_1$, where $n_1$ is greater than $n_2$;

a polymeric smoothing layer located in said channel between said elongate body and said first buffer layer, said smoothing layer having a refractive index which is lower than the refractive index $n_1$ of said first buffer layer; and a second buffer layer on said elongate body, said second buffer layer having a refractive index $n_3$ which is lower than $n_1$, said smoothing layer producing an interface having a roughness substantially less than that of said given roughness between said elongate body and said first buffer layer.

4. An optical waveguide according to claim 3 wherein the refractive index of said smoothing layer is substantially equal to the refractive index $n_2$ of said first buffer layer.

5. An optical waveguide according to claim 3 wherein the refractive index $n_3$ of said second buffer layer is substantially equal to the refractive index $n_2$ of said first buffer layer.

6. An optical waveguide according to claim 3 wherein said substrate member further comprises a substrate layer and a first electrode interposed between said substrate layer and said first buffer layer, and wherein said optical waveguide further includes a second electrode located on said second buffer layer.

7. A method of forming an optical waveguide, comprising the steps of forming a channel in a substrate;

providing a polymeric smoothing layer on the walls of the channel; and filling the channel with a polymeric waveguiding medium having a higher refractive index than those of the smoothing layer and the substrate.

8. A method according to claim 7, wherein the smoothing layer has a refractive index substantially equal to that of the substrate.

9. A method according to claim 8, wherein the channel is formed by etching the substrate.

* * * * *